[19] United States Patent  
Barnes

[11] 3,914,906  
[45] Oct. 28, 1975

[54] SANDING BLADE FOR RECIPROCATING SAW

[76] Inventor: Howard M. Barnes, 11243 NE. Shaver, Portland, Oreg. 97220

[22] Filed: June 20, 1974

[21] Appl. No.: 481,347

[52] U.S. Cl. .......................... 51/170 TL; 145/35 R
[51] Int. Cl.² .................. B24B 23/00; B24B 23/04
[58] Field of Search ............ 51/170 TL, 170 R, 181, 51/391–394, 401, 407, 406; 125/18; 30/392–394, 350; 7/13 R; 145/33 C, 33 E, 35R

[56] References Cited
UNITED STATES PATENTS

| | | | |
|---|---|---|---|
| 289,879 | 12/1883 | Almond | 51/392 |
| 1,529,472 | 3/1925 | Falos | 145/33 C UX |
| 1,954,575 | 4/1934 | Pearson | 51/170 TL |
| 2,197,626 | 4/1940 | VonScheven | 51/170 TL UX |
| 2,210,733 | 8/1940 | Schmid | 51/170 TL UX |
| 2,406,556 | 8/1946 | Moon | 51/170 TL |
| 2,524,323 | 10/1950 | Lloyd-Young | 51/181 X |
| 3,197,294 | 7/1965 | Adams | 51/392 X |
| 3,226,885 | 1/1966 | Cutrone | 51/170 TL |
| 3,353,526 | 11/1967 | Daem | 30/350 UX |
| 3,686,799 | 8/1972 | Doty | 125/18 X |

Primary Examiner—Donald G. Kelly
Attorney, Agent, or Firm—Klarquist, Sparkman, Campbell, Leigh, Hall and Whinston

[57] ABSTRACT

A reciprocating saw, as for example, a saber or scroll saw, is provided with a rigid blade member to which is removably applied abrasive sheet material having a pressure sensitive adhesive backing, the blade being retained in the saw chuck in the same manner as a saw blade and being useful in sanding hard-to-reach places.

3 Claims, 14 Drawing Figures

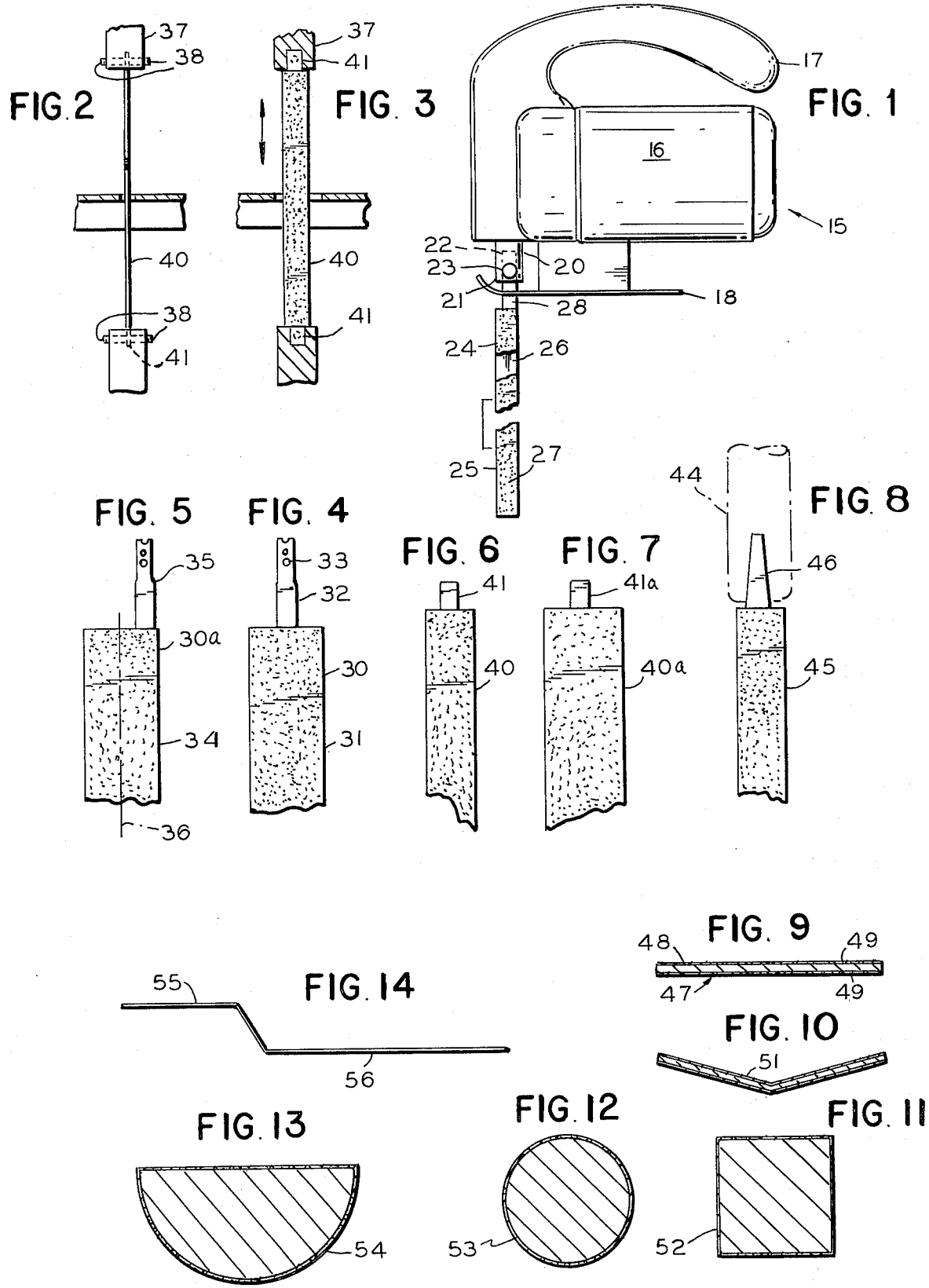

SANDING BLADE FOR RECIPROCATING SAW

BACKGROUND OF THE INVENTION

This invention relates to reciprocating saws and, more particularly, to a sanding attachment for such saws.

Although a wide variety of powered and mechanized tools have been provided for the home workshop, there has been a long felt need for a tool that would eliminate laborious hand sanding or dressing down and especially, a tool that would permit the craftsman to sand into corners, in delicate scroll work, and in slots and circles.

Accordingly, it is the primary object of the present invention to provide an attachment for a reciprocating saw that will eliminate hand sanding and will permit the home craftsman to sand into corners, in delicate scroll work, and in slots and circles.

It is a further object of the present invention to provide such an attachment that will fit directly into the chuck of a reciprocating saw, such as a hand jig saw or a saber or scroll saw, in the same manner as a saw blade, thereby to require no additional attachments.

It is a still further object of the present invention to provide such an attachment that will permit the changing of abrasive grades on the attachment without the necessity of removing the attachment itself from the saw.

It is a still further object of the present invention to provide such an attachment that will permit the sanding of hitherto inaccessible areas, as for example, on autos, boats, cabinets, moldings, window sashes, models, and jewelry that now have to be sanded by hand.

It is a still further object of the present invention to provide such an attachment that will permit the home craftsman to sand minute slits which heretofore have not been able to be sanded.

It is a still further object of the present invention to provide such an attachment that will not leave cutting marks on the work which later have to be sanded out.

It is a still further object of the present invention to provide such an attachment that will work on metal, wood or plastic.

It is a still further object of the present invention to provide such an attachment that will permit sanding over the full surface of the attachment.

It is a still further object of the present invention to provide such an attachment that will permit sanding on large surfaces.

It is a final object of the present invention to provide an attachment that will rasp, rough sand and finish sand without the necessity of removing the attachment from the saw.

SUMMARY OF THE INVENTION

My attachment for a reciprocating saw comprises a longitudinally extended, rigid support member or sanding blade having a surface adapted to support a piece of flexible abrasive sheet material. The blade has an end of reduced width that can be inserted in the chuck of a reciprocating saw, as for example, in the chuck of a jig, saber or scroll saw, and which end is retained in the chuck in the same manner as a regular saw blade.

The invention further comprises a piece of flexible abrasive sheet material, which has a backing of pressure sensitive adhesive thereon such that the material can be removably adhered to the surface of the support member or blade. In this manner the abrasive material can be removed and replaced as desired without the necessity of removing the blade from the saw.

The blade for the present invention can be provided in various widths and lengths and can be used with pressure sensitive adhesive coated sheet material of various grades of abrasiveness, thereby to provide the ability to rasp, rough sand and finish sand without changing blades and to enable the craftsman to perform any sanding action even in areas which have been heretofore inaccessible.

BRIEF DESCRIPTION OF THE DRAWINGS

In the drawings:

FIG. 1 is a side view of an embodiment of the present invention illustrated in combination with a reciprocating power saw commonly known as a saber saw;

FIG. 2 is a view of an embodiment of the invention in the chucks of a scroll saw;

FIG. 3 is a view taken on line 3—3 of FIG. 2;

FIG. 4 is a partial view of the end portion of an embodiment of the invention adapted for retention in the chuck of a jig or saber saw;

FIG. 5 is a partial view of an end portion of an embodiment of the invention like the one in FIG. 4 but having an end which is offset laterally from its longitudinal axis;

FIG. 6 is a partial view of an end portion of an embodiment of the invention adapted for retention in the chuck of a scroll saw;

FIG. 7 is a partial view of an end portion of an embodiment of the invention like the one in FIG. 6 but having a wider width;

FIG. 8 is a side view of an embodiment of the invention in the form of a manually operated tool;

FIG. 9 is a cross sectional view to an enlarged scale through the present invention;

FIG. 10 is a cross sectional view to an enlarged scale of an embodiment having a V-shaped cross section;

FIG. 11 is a cross sectional view to an enlarged scale of an embodiment having a square cross section;

FIG. 12 is a cross sectional view to an enlarged scale of an embodiment having a circular cross section;

FIG. 13 is a cross sectional view to an enlarged scale of an embodiment having a semi-circular cross section; and FIG. 14 is a side elevational view of an embodiment of the present invention having a tang portion which is laterally offset.

DESCRIPTION OF THE PREFERRED EMBODIMENTS

Referring to the drawings, FIG. 1 illustrates an embodiment of the present invention in combination with a portable reciprocating power saw 15 commonly known as a saber saw. The saw 15, which is of the usual construction, is driven by a motor 16 and is provided with a handle 17 and a base plate 18. An important element of the saw 15 is the reciprocating shaft or ram 20 which is provided with a chuck 21 having a slot 22 which is normally used for attaching a saw blade (not shown) and which latter is retained in position by a mounting screw 23.

In the present invention the saw blade is removed and replaced by a longitudinally extended, rigid support member 24 in the form of a sanding blade 25 having a surface 26 adapted to support a piece of flexible abrasive sheet material 27. The blade 25 is provided with an end 28 of reduced width such that the same can be retained in the saw chuck 21 in the same manner as the saw blade.

FIGS. 4 and 5 illustrate the end portions 30 and 30a of embodiments of the invention adapted for use with a saber saw as illustrated in FIG. 1. As such, FIG. 4 illustrates a sanding blade 31 having a symmetrically disposed end 32 of reduced width and which is provided with apertures 33 to receive the screw 23. FIG. 5 illustrates a sanding blade 34 also for use with a saber saw as illustrated in FIG. 1, but having an end 35 which is laterally offset from its longitudinal axis 36.

FIGS. 2 and 3 illustrate the invention mounted in the chucks 37 of a scroll saw and retained in position by the usual set screws 38 which normally retain the scroll saw blades. The sanding blade 40 is provided with symmetrically disposed ends 41, 41a of reduced width, as shown in FIGS. 6 and 7, which ends are retained by the set screws 38 in the same manner as they normally retain the saw blade.

The invention may be used in combination with a manually operated hand grip 44 as shown in FIG. 8, in which case the sanding blade 45 is provided with a tapered end tang 46 for retention in the handle.

The sanding blades are preferably made of metal, preferably band saw steel. They can be provided in various widths and lengths, depending on the purpose for which the blade is used. For example, I provided a ⅜ inch wide blade, 4½ inches long and 0.0032 inch thick for access to minute slits. Other desirable blade sizes are ¾ inch wide, 8 inches long and 1/16 inch thick; and one and ¼ inch wide, 10 inches long and 1/16 inch thick.

The sanding blades of my invention can be provided with a variety of cross sectional shapes. Typically, they will be as illustrated in FIG. 9, that is, generally having a rectangular cross section 47 much wider than it is thick, to both surfaces 48 of which are removably adhered the abrasive sheet material 49. Alternatively, the sanding blade may have a V-shaped cross section 51, as shown in FIG. 10; it may have a square cross section 52, as shown in FIG. 11; a circular cross section 53 as shown in FIG. 12; or a semi-circular cross section 54 as shown in FIG. 13.

FIG. 14 illustrates an embodiment of the invention in which the tang portion 55 is laterally offset so that the full area of the abrasive sheet material supporting surface 56 may be used for sanding.

The abrasive sheet material 27 is preferably provided with a pressure sensitive adhesive backing so that when it is used up, it can simply be peeled off the blade and replaced. A flexible abrasive sheet material suitable for use with the present invention is sold by Norton Coated Abrasive & Tape Division of the Norton Company, Troy, New York, as Lightning Metalite pressure sensitive adhesive coated cloth sheet provided with Closekote aluminum oxide grit. Such comes in a variety of grit grades to give the home craftsman an assortment of abrasive materials from which to choose. Preferably, the flexible abrasive sheet material 27 is applied to the entire length of the sanding blade.

I have thus provided an attachment for a reciprocating saw which makes it possible to apply replacement abrasive sheet material strips of any grade to a support member in the form of a sanding blade without the necessity of removing the blade from the saw chuck. The different grades make it possible to perform sanding techniques varying from a heavy rasping to a fine finish sanding using the same blade for all work. The size of the blade makes it possible to work on any kind of project from fine jewelry to commercial use in car body work. Abrasive material can be selected to sand metal, wood, or plastic. The blade will give a flat sanding surface allowing a smooth, flat sanded edge.

Use of the semi-circular and circular cross sectional shapes permit the attachment to be easily used in sanding circles. Use of the embodiment illustrated in FIG. 14 provides a tool in which the full sanding surface of the sanding blade may come in contact with a large area as would be necessary should it be desired to sand the surface of an automobile. The invention eliminates the waves usually left by hand sanding, yet provides a tool that is thin enough to get into areas not readily accessible with any other sanding tool or device. Use of the smallest size of sanding blade herein disclosed provides a knife edge, yet adequate stability for sanding in slits and otherwise unsandable areas.

The invention can be employed in a wood working shop, on the job, in jewelry making, in model making, and in commercial plants. Whereas a metal file tends to tear up a surface, the present invention sands smoothly. Metal files also tend to leave cutting marks on a surface that have to be sanded out. The present invention does finish work after a metal file has been used and it also does the same work as a metal file does.

The invention is particularly suitable for scroll work which is now largely left unsanded or sanded by hand labor.

I claim:

1. In combination with a reciprocating saw motor having a reciprocating shaft operatively connected thereto and a chuck fixed to said shaft and adapted to receive the end of a saw blade, said chuck being provided with retaining means for retaining said end of said saw blade in said chuck:

a longitudinally extended rigid relatively thin, blade shaped support member having a rectangular cross-section, said support member having surfaces on the flat sides thereof, said surfaces having relatively large surface areas in comparison with the thickness of said support member adapted to support a piece of flexible abrasive sheet material, said support member having an end of reduced width, said end being inserted in said chuck and retained by said retaining means in the same manner as said saw blade; and a piece of flexible abrasive sheet material of relatively large surface area and thin cross-sectional dimension for sanding and the like, said abrasive sheet material having a backing of pressure sensitive adhesive, said abrasive sheet material being removably attached to at least one of said surfaces of said support member by adhesion between said backing and said surface over the whole of said surface, whereby said sheet material can be removed and replaced as desired.

2. The combination of claim 1 in which said end of said support member is symmetrically disposed with respect to the longitudinal axis of said support member.

3. The combination of claim 1 in which said end of said support member is offset laterally with respect to the longitudinal axis of said support member.

* * * * *